(12) United States Patent
Ouvrier-Buffet et al.

(10) Patent No.: US 7,927,908 B2
(45) Date of Patent: Apr. 19, 2011

(54) METHOD FOR MANUFACTURING A BOLOMETRIC DETECTOR (75) Inventors: Jean-Louis Ouvrier-Buffet, Sevrier (FR); Christophe Dubarry, Claix (FR); Laurent Puech, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 12/686,103

(22) Filed: Jan. 12, 2010

(65) Prior Publication Data
US 2010/0184245 A1 Jul. 22, 2010

(30) Foreign Application Priority Data
Jan. 19, 2009 (FR) ...................................... 09 00215

(51) Int. Cl.
*H01L 21/00* (2006.01)
(52) U.S. Cl. ...................... 438/59; 438/52; 257/E31.026
(58) Field of Classification Search ..................... 438/59, 438/52, 53, 69, 85, 72, 48; 257/E31.026, 257/E31.127, E21.158
See application file for complete search history.

(56) References Cited

U.S. PATENT DOCUMENTS

| | | | | |
|---|---|---|---|---|
| 6,534,767 B1* | 3/2003 | Di Maio et al. | ............ | 250/338.2 |
| 6,753,526 B2* | 6/2004 | Vilain | ........................ | 250/338.1 |
| 7,054,052 B2* | 5/2006 | Niklaus et al. | ................ | 359/291 |
| 2005/0052725 A1* | 3/2005 | Niklaus et al. | ................ | 359/321 |
| 2007/0120059 A1* | 5/2007 | Tailhades et al. | ........... | 250/338.3 |
| 2007/0205364 A1* | 9/2007 | Ouvrier-Buffet et al. | . | 250/338.1 |
| 2009/0084958 A1* | 4/2009 | Vogt | ........................... | 250/338.4 |
| 2009/0218493 A1* | 9/2009 | McCaffrey et al. | ........ | 250/338.4 |
| 2009/0295277 A1* | 12/2009 | Logunov et al. | ............. | 313/504 |
| 2009/0321644 A1* | 12/2009 | Vogt et al. | .................. | 250/338.4 |
| 2010/0184245 A1* | 7/2010 | Ouvrier-Buffet et al. | ...... | 438/59 |
| 2010/0276597 A1* | 11/2010 | Ouvrier-Buffet | ............. | 250/349 |
| 2010/0294936 A1* | 11/2010 | Boberl et al. | .............. | 250/338.4 |

FOREIGN PATENT DOCUMENTS

| | | |
|---|---|---|
| FR | 2 864 065 A1 | 6/2005 |
| FR | 2 910 125 A1 | 6/2008 |
| WO | WO 2008/084158 A2 | 7/2008 |

OTHER PUBLICATIONS

Lussier et al.; "Characterization for strontium titinate/$Fe_3O_4$ and TiN/$Fe_3O_4$ interfaces;" *J. Vac. Sci. Techno.*; Jul./Aug. 2002; pp. 1609-1613; vol. B 20, No. 4.
French Search Report mailed on Sep. 28, 2009 in corresponding French Patent Application No. 09 00215 (with translation).

* cited by examiner

*Primary Examiner* — Walter L Lindsay, Jr.
(74) *Attorney, Agent, or Firm* — Oliff & Berridge, PLC (57) ABSTRACT The method is designed for manufacturing a bolometric detector equipped with a membrane suspended above a substrate by means of heat-insulating arms fixed to the substrate by anchoring points. The membrane has a heat-sensitive thin layer with a base comprising at least a semiconducting iron oxide. The method comprises at least a step of localized reduction and/or oxidation of the thin layer of semiconducting iron oxide to modify the degree of oxidation of the iron atom of a part of the thin layer of semiconducting iron oxide.

13 Claims, 9 Drawing Sheets

METHOD FOR MANUFACTURING A BOLOMETRIC DETECTOR

BACKGROUND OF THE INVENTION

The invention relates to a method for manufacturing a bolometric detector equipped with a membrane suspended above a substrate by means of heat-insulating arms fixed to the substrate via anchoring points, said membrane having a thin layer of heat-sensitive semiconducting iron oxide.

STATE OF THE ART

Figure 1:
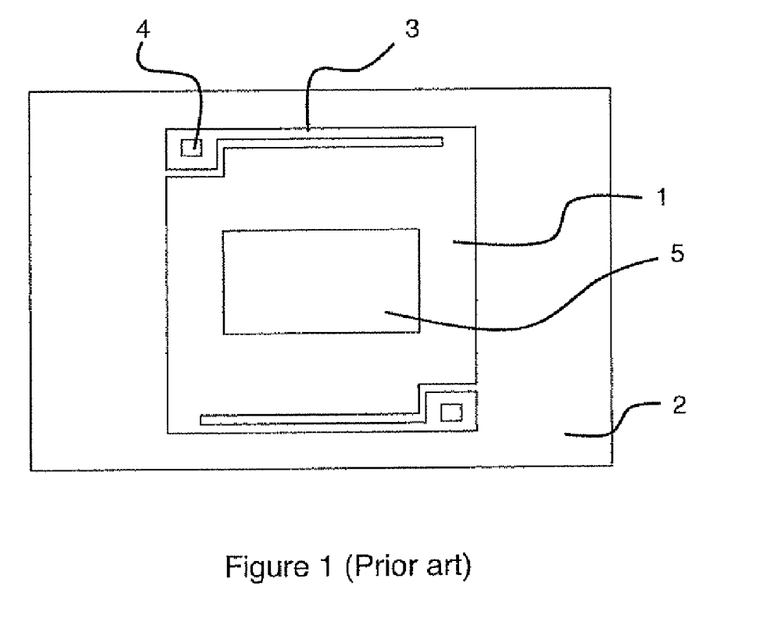
FIGS. 1 and 2 schematically represent a bolometric detector of the prior art, respectively in top view and in perspective view.
Figure 2:
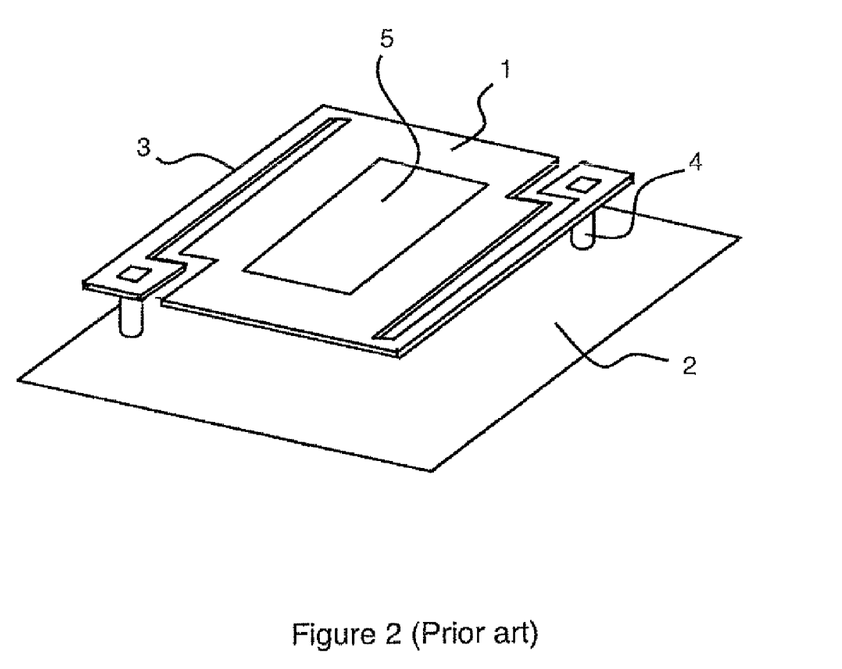

Bolometric detectors enable the power of an electromagnetic radiation to be measured in the terahertz frequency range or the power of infrared rays to be measured by converting the radiation into an electric signal. The terahertz frequency band designates electromagnetic waves extending approximately between 100 GHz and 30 THz. As illustrated in FIGS. 1 and 2, in the case of resistive bolometric detectors, the electromagnetic radiation is typically absorbed by a membrane 1 suspended above a substrate 2 (FIG. 2) by means of heat-insulating arms 3 fixed to substrate 2 via anchoring points 4. Membrane 1 absorbs the incident radiation, transforms the latter into heat and transmits the heat to a thermistor 5. Thermistor 5 is made from a heat-sensitive semiconducting material the essential characteristic whereof is to present a variation of its electrical resistance when its temperature varies.

This material may for example be vanadium oxide ($V_2O_5$, $VO_2$) produced in a semiconducting phase. The temperature rise of thermistor 5 then induces a voltage or current variation at the terminals of the bolometric detector, measured by a suitable electrical apparatus. Electrodes (not shown) are for example arranged at the level of anchoring points 4. An electronic circuit is integrated in conventional manner in substrate 2 to enable the measurements to be used. Heat-insulating arms 3 insulate membrane 1 thermally from substrate 2 thereby improving the sensitivity of measurement.

Figure 3:
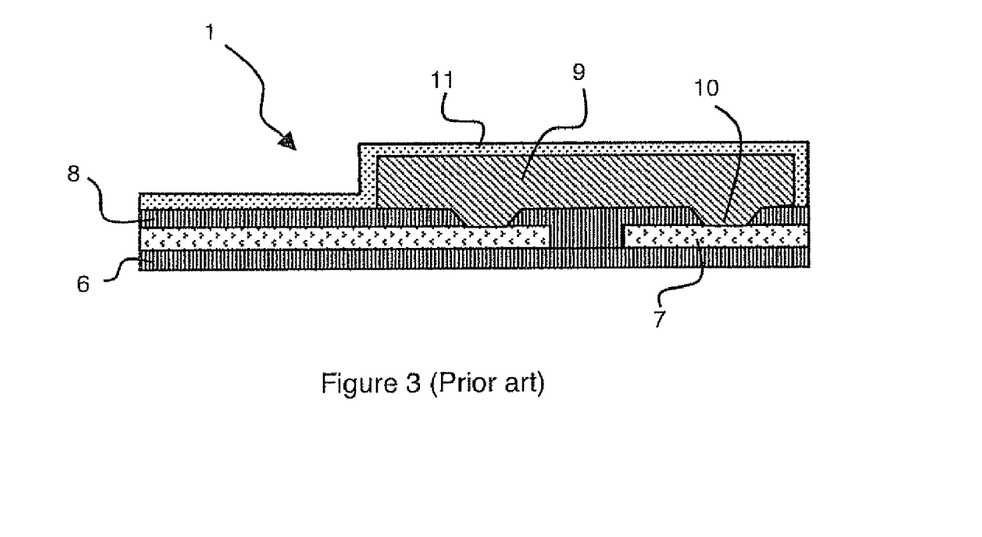
FIG. 3 schematically represents the membrane of the bolometric detector according to FIG. 1, in cross-section.

In United States Patent US-A-2007120059, the applicant described the use of spinel ferrites as thermistor for uncooled bolometric devices for infrared detection. Certain spinel-structured semiconducting oxides of iron-base transition metals have a moderate electrical resistivity and are very sensitive to temperature. In particular stoichiometric or vacancy spinel ferrites are products that are referred to as negative temperature coefficient products, that is to say they have a conductivity that increases with temperature. A bolometric detector represented in FIG. 3 is provided with a membrane 1 formed by superposition of a first dielectric thin layer 6 whereon there are arranged two coplanar electrodes 7 of a second dielectric thin layer 8 and of a spinel ferrite thin layer 9 constituting the thermistor. Dielectric thin layers 6 and 8 are heat-conducting so as to transfer the heat absorbed by membrane 1 to thermistor 5. Second dielectric thin layer 8 is provided with contact openings 10 so as to bring spinel-structured ferrite 9 into contact with electrodes 7. A passivation layer 11 formed on the top part of the membrane (at the top in FIG. 3) performs protection of membrane 1.

In Patent application WO2008084158, the applicant also disclosed the use of a thermistor formed by a two-phase material comprising a spinel oxide phase and an iron monoxide phase with a sodium chloride NaCl structure. This association proves particularly efficient as sensitive material of a bolometric device for infrared detection.

OBJECT OF THE INVENTION

The object of the invention is to achieve a functionalized bolometric detector having a good sensitivity and that is optimized in terms of signal-to-noise ratio, by means of an industrializable manufacturing method that is easy to implement and inexpensive.

According to the invention, this object is achieved by a manufacturing method according to the appended claims. In particular this object is achieved by the fact that the method comprises at least a step of localized reduction and/or oxidation of the thin layer of semiconducting iron oxide to modify the degree of oxidation of the iron atom of a part of the thin layer of semiconducting iron oxide.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PARTICULAR EMBODIMENTS OF THE INVENTION

Figure 4:
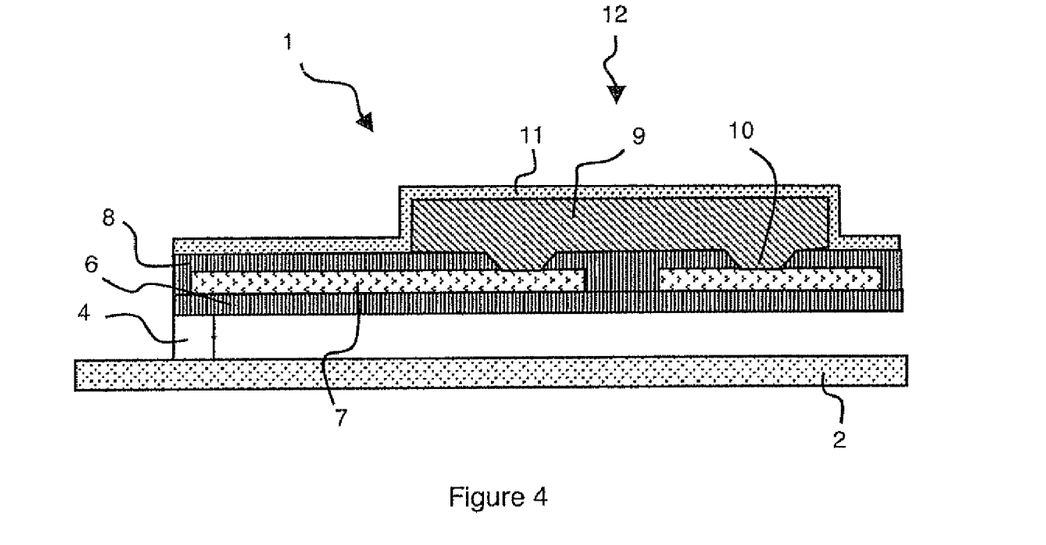
FIG. 4 schematically represents a bolometric detector according to a particular embodiment of the invention, in cross-section.

The bolometric detector represented in FIG. 4 conventionally comprises a membrane 1 able to absorb infrared radiation suspended above a substrate 2. Suspended membrane 1 is achieved by any known method, generally by a first deposition on substrate 2 of a sacrificial layer (not shown), for example made of polyimide, which acts as support for the thin layers forming membrane 1. The sacrificial layer preferably has a thickness comprised between 1 μm and 5 μm corresponding to a quarter of the wavelength to be detected. Before etching of the sacrificial layer is performed, a passivation layer 11 can advantageously be formed on the top part of membrane 1 (at the top in FIG. 4) to prevent any chemical reaction when etching of the sacrificial layer is performed.

Membrane 1 is suspended above substrate 2 by means of heat-insulating arms 3 fixed to substrate 2 via anchoring points 4. These heat-insulating arms 3 limit the heat losses of membrane 1 and thereby improve the sensitivity of thermal detection.

Membrane 1 comprises a thin layer of heat-sensitive semiconducting iron oxide 9 forming a thermistor. The area of the bolometric detector delineated by this thin layer of semiconducting iron oxide 9 forms a bolometric plate 12. The partially oxidized iron oxides present a certain resistivity comprised between 0.01 Ω·cm and 1000 Ω·cm. The partially oxidized iron oxides such as spinel magnetic iron oxide or magnetite $Fe_3O_4$ and iron oxide also known as wustite $Fe_{1-x}O$ with iron-vacancy have semiconducting properties.

Thin layer of semiconducting iron oxide 9 can be constituted by several iron oxide phases, the iron having different degrees of oxidation $Fe^{2+}$, $Fe^{3+}$. It must on the other hand comprise at least one semiconducting iron oxide phase advantageously chosen from spinel-structure magnetite $Fe_3O_4$ or iron-vacancy wustite $Fe_{1-x}O$.

Thin layer of semiconducting iron oxide 9 can also be at least partially spinel-structured, for example comprising a spinel-structure iron oxide phase such as semiconducting magnetite $Fe_3O_4$ and/or insulating maghemite $\gamma$-$Fe_2O_3$ as described in Patent US-A-2007120059. These iron oxides, apart from maghemite $\gamma$-$Fe_2O_3$, present the particularity of being partially oxidized and of being formed by a mixture of $Fe^{2+}$ and $Fe^{3+}$. This characteristic gives them interesting semiconducting properties with a moderate electrical resistivity and these oxides are known to be heat-sensitive. They can therefore detect weak-intensity infrared radiations while minimizing electronic noise.

As described in Patent application WO2008084158, thin layer of semiconducting iron oxide 9 can also be formed by mixed phases of semiconducting iron oxide such as magnetite $Fe_3O_4$ and/or iron-vacancy wustite $Fe_{1-x}O$ and insulating iron oxide such as ferric oxide $Fe_2O_3$ or iron vacancy-free wustite FeO. The distribution of each of the phases is determined such as to obtain the best possible performances in terms of sensitivity and signal-to-noise ratio.

Membrane 1 can comprise one or more dielectric layers (6, 8), for example made from silicon nitride SiN, silicon dioxide $SiO_2$, silicon monoxide SiO or zinc sulphide ZnS. Membrane preferably has a thickness comprised between 0.01 μm and 2 μm.

Irradiation of membrane 1 results in a heat rise which is transferred to thin layer of semiconducting iron oxide 9. Due to the effect of the heat, the resistivity of thin layer of semiconducting iron oxide 9 varies. This variation can be measured by means of electrodes 7 connected to a suitable read circuit (not shown) on substrate 2.

As in FIG. 3, membrane 1 of FIG. 4 for example comprises a first dielectric thin layer 6, a second dielectric thin layer 8 and two coplanar electrodes 7 between first and second dielectric thin layers 6 and 8. Electrodes 7 extend into heat-insulating arms 3 and pass via anchoring points 4, then being connected to the read circuit on substrate 2. Contact openings 10 formed in second dielectric thin layer 8 enable semiconducting iron oxide layer 9 to be connected to the read circuit. The two coplanar electrodes 7 are advantageously metal electrodes, for example made from titanium Ti, titanium nitride TiN, platinum Pt or nickel chromium NiCr.

According to a particular embodiment, membrane 1 is produced by successive deposition of thin layers by means of any known method. The depositions are preferably performed at low temperature, advantageously by cathode sputtering or Plasma Enhanced Chemical Vapor Deposition (PECVD).

Figure 5:
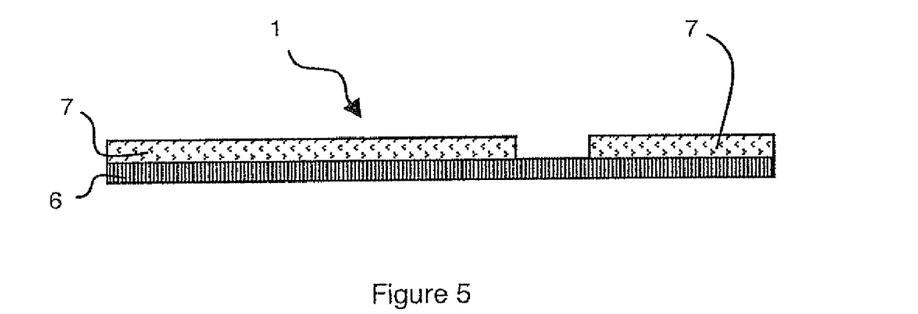
FIGS. 5 to 9 schematically represent the different steps of the method for manufacturing a membrane for a bolometric detector according to FIG. 4, in cross-section.

As represented in FIG. 5, the two coplanar electrodes 7 are deposited on first dielectric layer 6 by metallization by means of conventional methods. The shape of the electrodes is obtained by chemical or reactive ion etching. The thickness of electrodes 7 is comprised between 0.005 μm and 0.1 μm. As absorption of the infrared radiation by electrode 7 is a function of the square of its resistance, the thickness of the electrode has to be adjusted to match the required absorption rate. Electrodes 7 are then connected to the read circuit on substrate 2 by conventional contact connecting methods.

Figure 6:
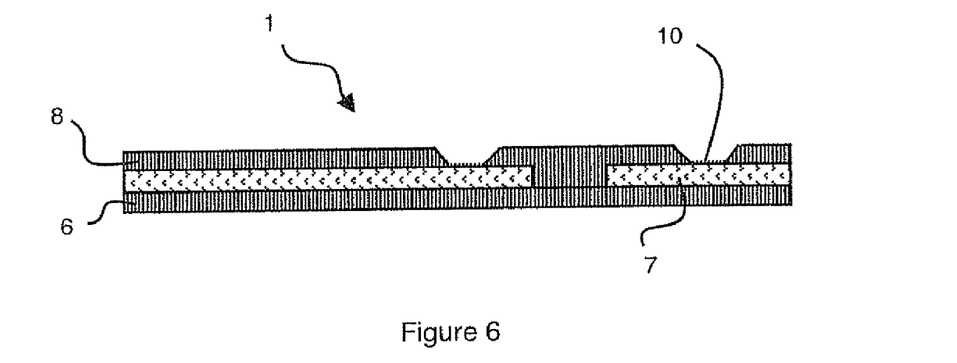

After deposition of second dielectric thin layer 8, two contact openings 10, represented in FIG. 6, are etched in second dielectric thin layer 8 by means of any known method.

Figure 7:
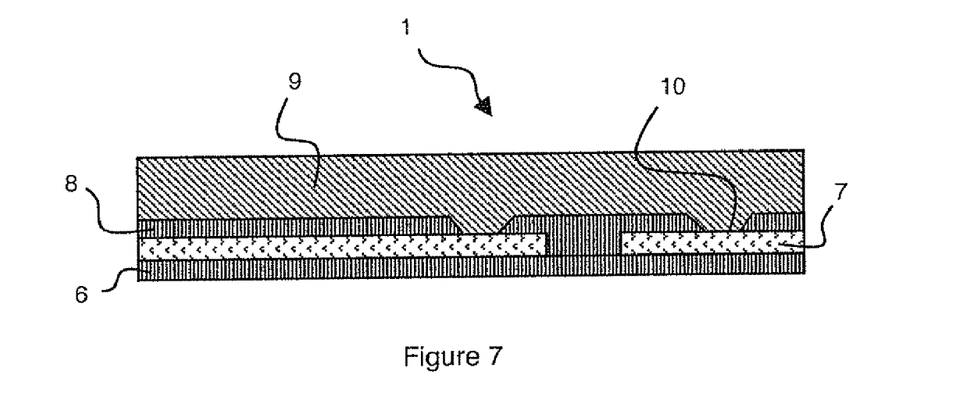

As represented in FIG. 7, a thin layer of semiconducting iron oxide 9 with a thickness comprised between 0.01 μm and 2 μm is then deposited on second dielectric thin layer 8 to cover the whole of the surface of membrane 1. Production of bolometric plate 12 then requires selective etching of a part of this thin layer of semiconducting iron oxide 9. This etching is advantageously performed by wet process etching using an acid etching solution. Acid etching solutions are for example solutions of hydrochloric acid HCl, nitric acid $HNO_3$, sulphuric acid $H_2SO_4$ or phosphoric acid $H_3PO_4$.

To enhance etching of thin layer of semiconducting iron oxide 9, wet process etching is activated reducing the iron oxide of the part of thin semiconducting layer 9 that is to be etched to the form of iron ($Fe^0$). Wet process etching is in fact greatly inhibited by the presence of certain iron oxide phases, in particular ferric oxides $\alpha$-$Fe_2O_3$ or $\gamma$-$Fe_2O_3$ in a layer of magnetite $Fe_3O_4$ but which on the other hand presents very interesting thermistor properties. Iron at the degree of oxidation III Fe(III), the most oxidized and constituting ferric oxides, is however known to be the most thermo-dynamically stable iron in an aqueous medium. The etching rate of ferric oxides is consequently lower than that of iron oxides of lower degrees. On the contrary, the etching rate of iron is higher than that of iron oxides. Metallic iron ($Fe^0$) has a conductivity of more than $2*10^7$ S·m$^{-1}$.

To modify the degree of oxidation of the iron atom of a part of thin layer of semiconducting iron oxide 9, thin layer of semiconducting iron oxide 9 is locally reduced. The modification results here in a reduction of the degree of oxidation of the iron atom. This reduction step enables at least one metallic iron area (14) to be obtained, which is easier to etch by acid etching. A solution less concentrated in acid can consequently be used to etch metallic iron area or areas (14). The acid etching solution, which is less aggressive, does not damage a generally resin-base or inorganic material-base mask 13 defining the etching patterns. This reduction step therefore enables the integrity of the patterns of mask 13 to be preserved and wet process etching to be optimized improving the selectivity of etching and control of the etching thickness.

According to an alternative embodiment, to enhance etching of thin layer of semiconducting iron oxide 9, wet process etching can be activated reducing the iron oxide of the part of semiconducting thin layer 9 that is to be etched to iron with a lower degree of oxidation than ferric oxides $Fe_2O_3$ that are too stable, for example to iron (II). The oxygen content is globally lower than the initial thin layer of semiconducting iron oxide 9. The resistivity of the reduced area is then preferably less than 1 Ω·m.

Figure 8:
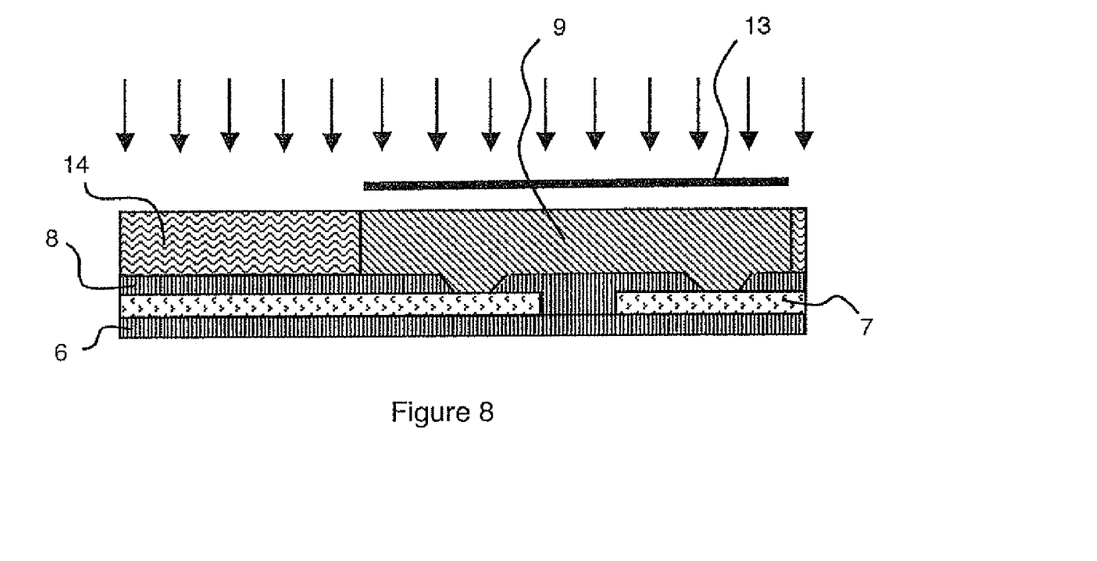

As represented in FIG. 8, the method for manufacturing a bolometric detector, after thin layer of semiconducting iron oxide 9 has been deposited on membrane 1, advantageously comprises at least one localized reduction of thin layer of semiconducting iron oxide 9 through mask 13 to form at least one metallic iron area 14.

Depending on the reduction conditions, reduction can be performed over the whole thickness of thin layer of semiconducting iron oxide 9 or at the surface thereof only. In the latter case, the presence of iron will nevertheless have an activating effect on wet process etching.

Localized reduction of thin layer of semiconducting iron oxide 9 is preferably performed by means of a reactor used for reactive ion etching (RIE) under reduced pressure or low pressure, from 1 to 100 mTorr, in the presence of at least one reducing species or a noble gas. Traditionally, such a reactor is designed for etching assisted by a large ion bombardment. In the case of the invention, such a reactor enables a large-density bombardment to be performed for example under an argon or xenon flow. The reducing species can be the plasma itself. The reducing plasmas used are advantageously chosen from hydrogen $H_2$ and noble gases, for example argon Ar, xenon Xe and helium He, the latter enabling the iron oxide to be reduced by preferential oxygen sputtering.

The ion bombardment conditions, for example the mass of the ions, their kinetic energy and their angle of incidence and the presence or not of a reducing species such as $H_2$, CO or NO, enable the $Fe^{3+}$ ions to be reduced to $Fe^{2+}$ and then to $Fe^0$ and $Fe^{2+}$ to be reduced to $Fe^0$. The plasma generated can in fact release $O^{2-}$ ions from the iron oxides of semiconducting thin layer 9 and reduce the $Fe^{3+}$ and $Fe^{2+}$ ions with gaseous release of oxygen according to the following reactions:

$$2Fe^{3+} + O^{2-} \rightarrow 2Fe^{2+} + \frac{1}{2}O_2$$
$$2Fe^{2+} + 2O^{2-} \rightarrow 2Fe^0 + O_2$$

According to a variant, localized reduction can be achieved by annealing with a hard mask. Annealing is preferably performed at a temperature of less than 300° C. in order not to impair the components that may be present on substrate 2. Mask 13 is a polymer resin or is made from inorganic material suited to the annealing conditions. A nitride-base mask 13 can be used from 300° C. to 1000° C. and a porous photoresist mask can be used from 150° C. to 200° C. Mask 13 is deposited on the areas of thin layer of semiconducting iron oxide 9 that are not to be annealed, thereby forming a passivation layer. Annealing is performed in a reducing atmosphere, i.e. in the presence of reducing species preferably chosen from hydrogen $H_2$, carbon monoxide CO or nitrogen monoxide NO. The areas exposed to the reducing species flux are reduced selectively and in localized manner.

According to the Ellingham diagram, reduction of the iron oxides obeys the following equilibriums:

In the presence of hydrogen:

$$3Fe_2O_3 + H_2 \leftrightarrow 2Fe_3O_4 + H_2O$$
$$\frac{1}{4}Fe_3O_4 + H_2 \leftrightarrow \frac{3}{4}Fe + H_2O$$

In the presence of carbon monoxide:

$$3Fe_2O_3 + CO \leftrightarrow 2Fe_3O_4 + CO_2$$
$$\frac{1}{4}Fe_3O_4 + CO \leftrightarrow \frac{3}{4}Fe + CO_2$$

The above equilibriums foresee easy reduction of the iron oxides by CO or $H_2$ in a controlled atmosphere and at relatively low temperatures. For example purposes, the table below sets out the ratio of the respective partial pressures of $H_2$ and $H_2O$ $(p_{H2}/p_{H2O})^{eq}$ and the ratio of the respective partial pressures of CO and $CO_2$ $(p_{CO}/p_{CO2})^{eq}$ for the $Fe_2O_3$/$Fe_3O_4$ and $Fe_3O_4$/Fe equilibriums at temperatures of 25° C. and 300° C.

|  | $(p_{H2}/p_{H2O})^{eq}$ | $(p_{CO}/p_{CO2})^{eq}$ |
|---|---|---|
| T = 25° C. |  |  |
| $Fe_2O_3$/$Fe_3O_4$ | ~$10^{-7}$ | <$10^{-8}$ |
| $Fe_3O_4$/Fe | ~$10^4$ | ~1 |
| T = 300° C. |  |  |
| $Fe_2O_3$/$Fe_3O_4$ | ~$10^{-6}$ | ~$10^{-8}$ |
| $Fe_3O_4$/Fe | ~10 | ~1 |

Although the reduction reactions can be performed at a temperature of 25° C., thermal activation is nevertheless necessary to promote diffusion of the $H_2$ and CO reducing species into the thin layers of semiconducting iron oxide 9.

This temperature increase must however not damage the other constituent components of the bolometric detector, in particular the read circuit of the bolometer present on substrate 2.

Metallic iron area or areas 14 are then eliminated by selective chemical etching through the same mask 13, another mask 13 having the same etching patterns or without a mask 13, by means of any known method. Metallic iron area or areas 14 delineate bolometric plate 12 (FIG. 9).

Figure 9:
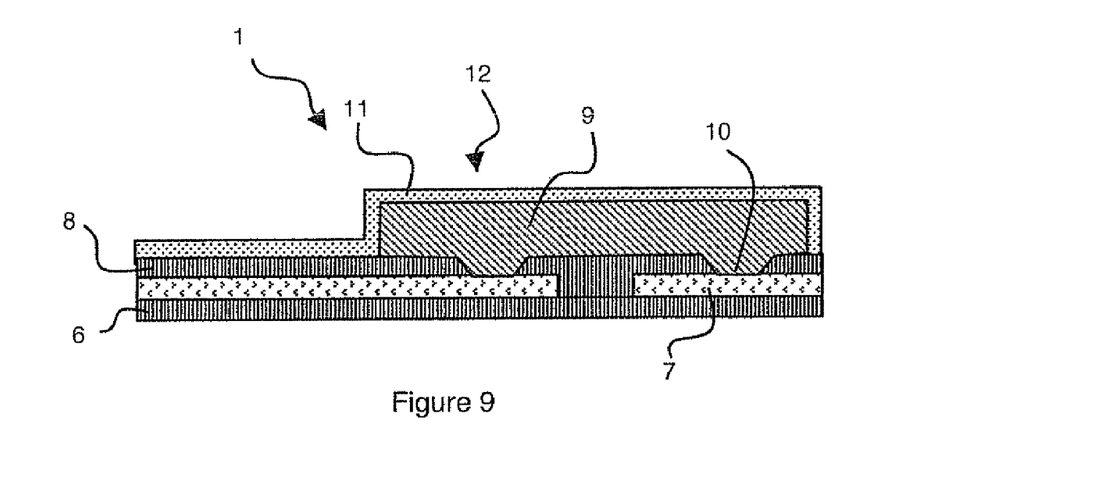

A passivation layer 11 represented in FIG. 9 is then produced by means of any known method on the top part of membrane 1 (at the top in FIG. 9) before the sacrificial layer (not shown) is eliminated to give a suspended structure of membrane 1.

Membrane 1 is then sliced mechanically at the level of heat-insulating arms 3 to define the final width and length of heat-insulating arms 3. The slicing technique is preferably identical to that used for integrated circuits, micro-electronics or microsystems.

According to a particular embodiment, membrane 1 comprises at least one titanium nitride TiN-base electrode 7. A. Lussier et al, in the article "Characterization for strontium titanate/$Fe_3O_4$ and TiN/$Fe_4O_4$ interfaces" (J. Vac. Sci. Technol. B20 (4), July/August 2002, P. 1609-1613), disclose that titanium nitride TiN interacts with iron oxides, in particular with magnetite $Fe_3O_4$, to form a complex interface comprised of titanium oxide $TiO_2$ and wustite FeO. $TiO_2$ is however an electrically insulating material, as is wustite FeO. This interface increases the contact resistance between titanium nitride TiN electrodes 7 and thin layer of semiconducting iron oxide 9. The sensitivity and signal-to-noise ratio are then affected by the existence of such an interface. To overcome this drawback and to improve the quality of the TiN/iron oxide contacts at the level of contact openings 10, the manufacturing method can advantageously comprise a step of formation of a metallic iron area 14a in contact with electrode 7, by localized reduction of thin layer of semiconducting iron oxide 9.

Figure 10:
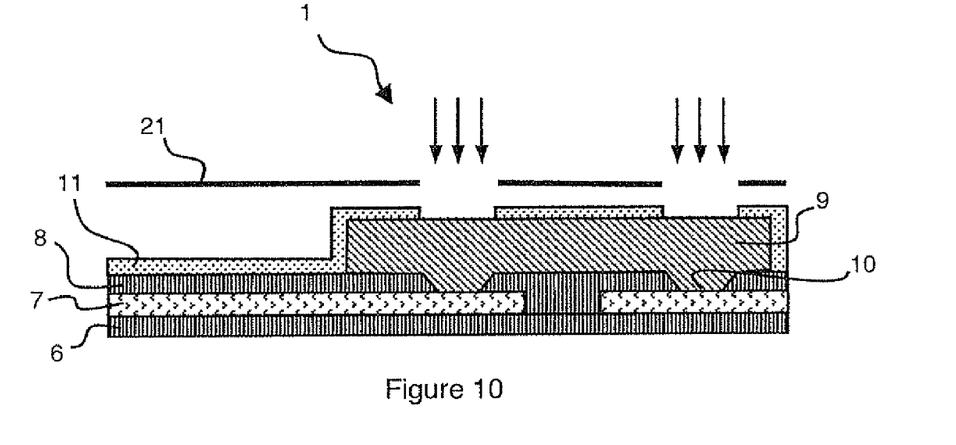
FIGS. 10 and 11 schematically represent the different steps of an alternative embodiment of the method for manufacturing a membrane for a bolometric detector according to FIG. 4, in cross-section.
Figure 11:
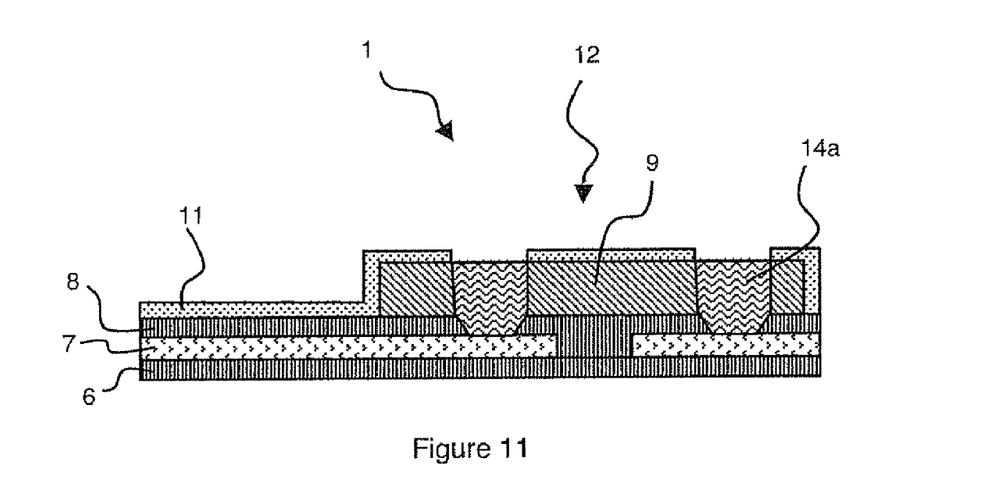

As represented in FIG. 10, localized reduction is then performed after passivation layer 11 has been eliminated at the level of the areas to be reduced. The techniques of annealing or of ion bombardment performed by means of the reactive ion etching (RIE) technique described above can be used for this localized reduction. Localized reduction is preferably performed by RIE through a mask 21 defining etching patterns corresponding to contact openings 10 (FIG. 10). The conditions for irradiation by the reducing plasma are defined such as to reduce thin layer of semiconducting iron oxide 9 over the whole of the thickness thereof so that metallic iron area 14a thus obtained is pass-through in the direction of the thickness of thin layer of semiconducting iron oxide 9 (FIG. 11). Metallic iron area 14a, in contact with electrode 7, performs electrical connection and enables the contact resistance between electrode 7 and semiconducting thin layer 9 to be greatly reduced.

Localized reduction can also reach titanium nitride TiN-base electrode 7 modifying the conditions of bombardment of the reactive ion etching, in particular by increasing the kinetic energy of the ions. Titanium nitride TiN-base electrode 7 then comprises at least one metallic titanium Ti area in contact with metallic iron area 14a of thin layer of semiconducting iron oxide 9.

According to a non-illustrated embodiment, the bolometric detector can also comprise a plurality of bolometric plates 12 in the form of a pixel matrix lattice that can be connected for example to a CCD or CMOS matrix. With an appropriate imagery system, the device then constitutes an infrared camera.

The bolometric device can also be integrated in a structure referred to as monolithic, fabricated in collective manner by the microelectronics methods developed for silicon.

Monolithic infrared imaging systems, operating at ambient temperature, can for example be produced by connecting the pixel matrix lattice directly to a CMOS or CCD type multiplexing circuit. Substrate 2 can then be formed by an integrated electronic circuit comprising on the one hand stimuli and reading devices and on the other hand the multiplexing components enabling the signals from the pixel lattice array to be serialized and transmitted to a reduced number of outputs to be used by a usual imaging system.

The method for manufacturing the bolometric detector enables bolometric detectors to be achieved integrating reflecting filters in their structure. In conventional manner, filters can be located on the optical infrared radiation path, upstream from the bolometric detector structure. The filters and the bolometric detector then form two independent elements.

Figure 12:
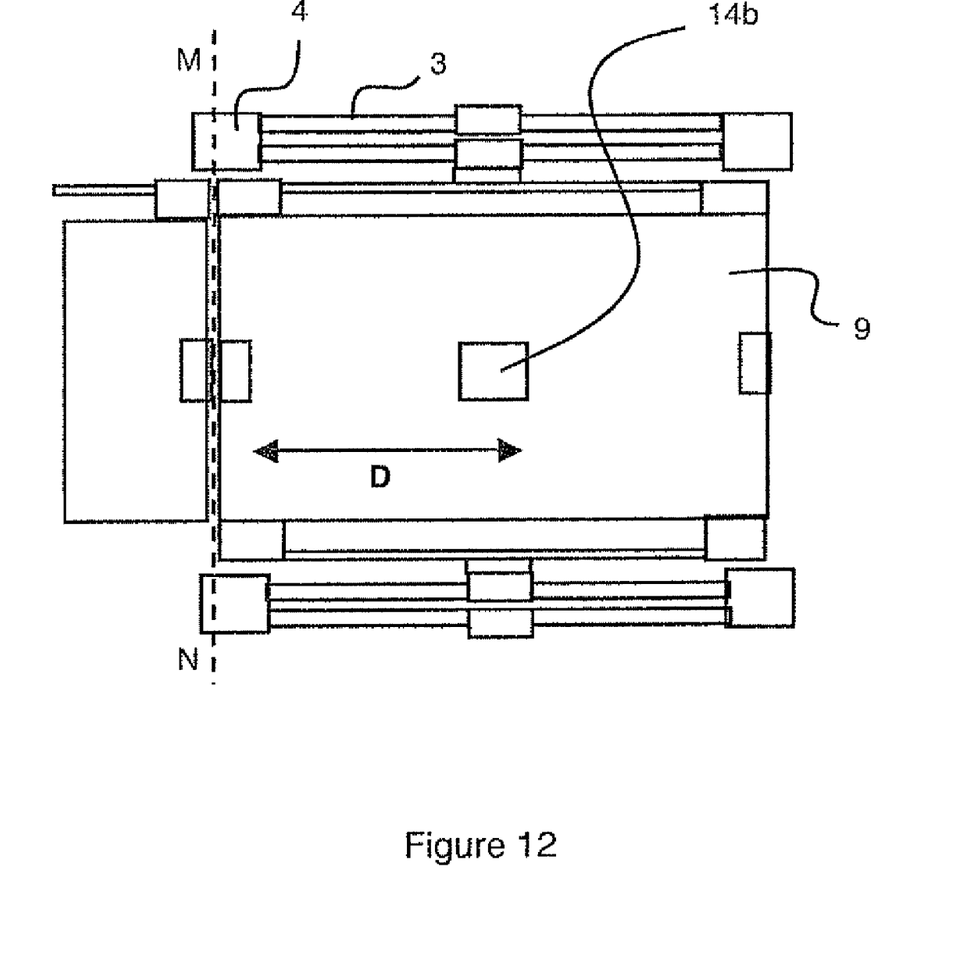
FIG. 12 schematically represents a bolometric detector according to a second particular embodiment of the invention, in top view.

According to a particular embodiment represented in FIG. 12, the method for manufacturing a bolometric detector successively, as in the above, comprises formation of a membrane 1 suspended above a substrate 2, deposition of a thin layer of semiconducting iron oxide 9 on the whole of membrane 1 and localized reduction of thin layer of semiconducting iron oxide 9. Localized reduction is performed so as to simultaneously or successively form several metallic iron areas 14b forming repetitive identical patterns by means of one of the two annealing or reactive ion etching bombardment techniques described above. These metallic iron areas 14b are arranged in periodic manner, with a predefined pitch D that defines the resonance frequency of the filter. Metallic iron area 14b can have various shapes, for example round, square or in the shape of a cross. Metallic iron areas 14b thus form a reflecting filter at a certain wavelength. Metallic iron areas 14b then preferably have a conductivity of less than $1*10^6$ $S \cdot m^{-1}$. The shape of the pattern will define the width of the filter. Wavelengths substantially higher or lower than the wavelength to be reflected are thereby absorbed.

As represented in FIG. 12, several bolometric plates 12 are then obtained by mechanical slicing along the axis MN, certain metallic iron areas 14b then being split in two. The thickness of slicing MN has to be sufficiently small so as not to interfere with operation of the filter.

Figure 13:
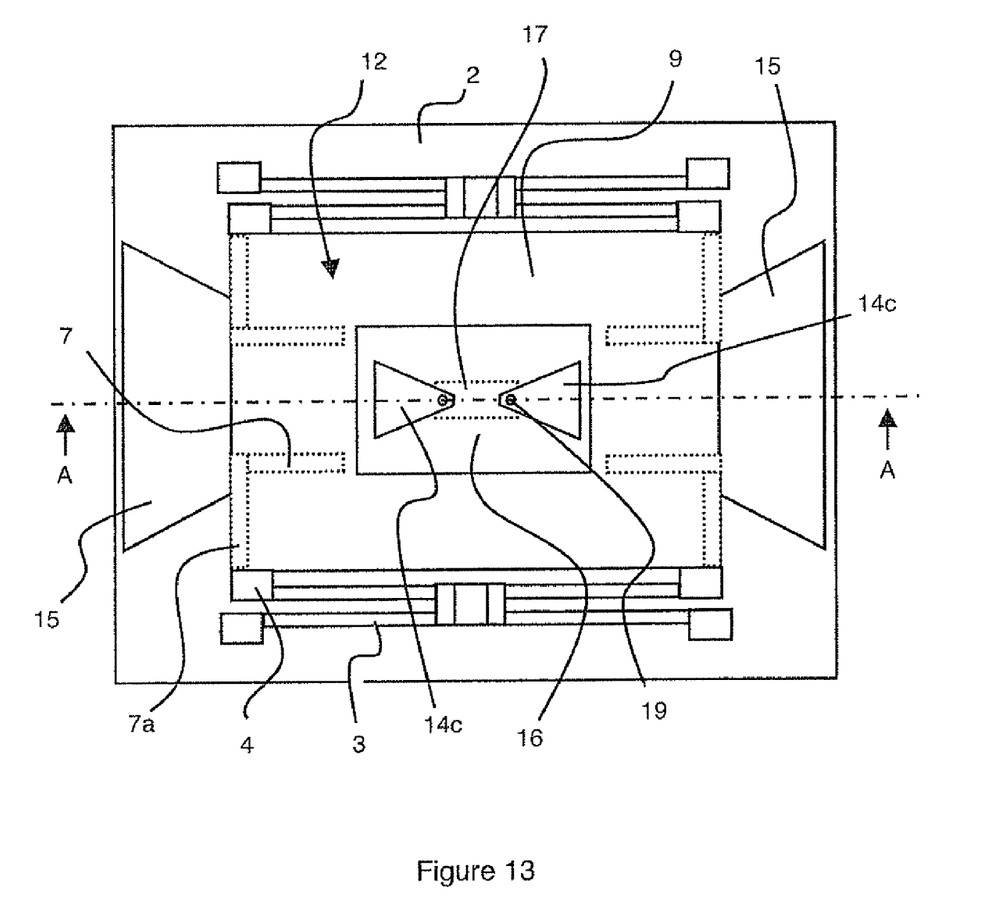
FIG. 13 schematically represents a bolometric detector according to a third particular embodiment of the invention, in top view.

According to another particular embodiment represented in FIG. 13, the method for manufacturing a bolometric detector enables a bolometric detector of capacitive structure suitable for the terahertz range to be obtained. The terahertz frequency band is intermediate between the radioelectric frequencies of microwave and the optical frequencies of infrared. The absorption being equal to the square of the wavelength to be absorbed $\lambda^2_{initial}$, when the surface of bolometric plate 12 is much smaller than the value $\lambda^2_{initial}$, the wavelength cannot be directly absorbed by bolometric plate 12. A system of antennas 15 arranged on substrate 2 is consequently generally used to absorb electromagnetic radiations having wavelength comprised in this range. Antennas 15 preferably have the shape of an isosceles triangle having parallel bases and an apex opposite their base that is directed towards the centre of the bolometric detector. To measure this radiation, a capacitive coupling is then advantageously made between the system of antennas 15 and bolometric plate 12.

Capacitive coupling is advantageously performed by two electrically conducting metallic iron areas 14c and the two antennas 15 arranged on substrate 2. The two metallic iron areas 14 preferably also have the shape of an isosceles triangle having bases parallel to the bases of the antennas and an apex 19 opposite their base that is directed towards the centre of the bolometric detector. The two metallic iron areas 14 are electrically insulated from one another by an electrically insulating and heat-conducting area formed by a layer of totally oxidized iron oxide 16, of ferric oxide $Fe_2O_3$ such as $\gamma Fe_2O_3$ or of hematite $\alpha\text{-}Fe_2O_3$. Layer of totally oxidized iron oxide 16 insulates the two metallic iron areas 14c to prevent short-circuiting. As described below, apexes 19 of antennas 15 are connected by a resistive element 17.

Figure 17:
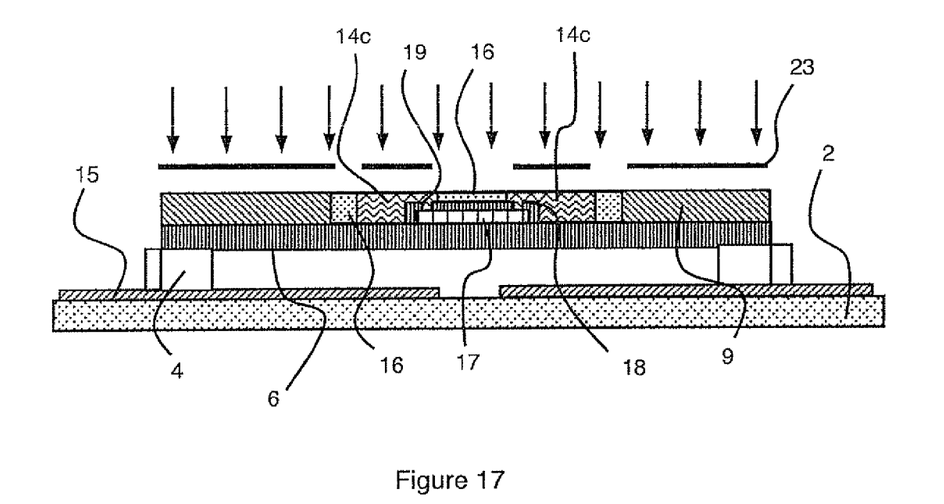

As represented in FIG. 17, the bolometric detector then comprises a membrane 1 suspended above a substrate 2 provided with two antennas 15. Resistive element 17 covered by thin layer of semiconducting iron oxide 9 forming the thermistor is located on membrane 1. Resistive element 17 is electrically insulated by a dielectric layer 18 preferably made from SiN, $SiO_2$, SiO or ZnS. Such a layer is heat-conductive. The two metallic iron areas 14c are arranged on each side of resistive element 17 and are connected to the latter by contacts made at apexes 19 of metallic iron areas 14c through dielectric thin layer 18. Absorption by the two antennas 15 of the electro-magnetic radiation, more particularly of terahertz frequency, causes a variation of the electrical charges at the level of antennas 15. This variation is measured by capacitive coupling with the electrically conducting metallic iron areas 14c. Due to the effect of this capacitive coupling, a current then flows in resistive element 17 and induces heating of this resistive element 17. Heat-conductive dielectric layer 18 and thin layer of totally oxidized iron oxide 16, which is electrically insulating and heat-conductive, transmit the heat emitted by resistive element 17 to thin layer of semiconducting iron oxide 9. Absorption of the terahertz frequency consequently gives rise to a variation of the resistivity of the heat-sensitive thin layer of semiconducting iron oxide 9.

Electrodes 7, represented in FIG. 13, formed for example by titanium nitride TiN, enable the resistance variations of the thin layer of semiconducting iron oxide 9 to be measured and transmit the signal to the read circuit present on substrate 2 via anchoring points 4. In the particular embodiment of FIG. 13, four electrodes 7, each having two L-shaped branches 7a and 7b, are formed in symmetric manner with respect to the centre of the bolometric detector. Each electrode 7 comprises a first branch 7a, on the periphery of thin layer of semiconducting iron oxide 9, which branch is parallel to the bases of antennas 15 and of metallic iron areas 14c. The second branches 7b are on the contrary not arranged on the periphery of thin layer of semiconducting iron oxide 9.

The method for manufacturing the bolometric detector of capacitive structure according to FIGS. 13 to 17 comprises at least a step of localized reduction and/or oxidation of the thin layer of semiconducting iron oxide 9 to modify the degree of oxidation of the iron atom of a part of the thin layer of semiconducting iron oxide 9. Areas of iron, of insulating iron oxide or of partially oxidized iron oxide with different electrical and heat conduction properties will thus be able to be obtained.

Figure 14:
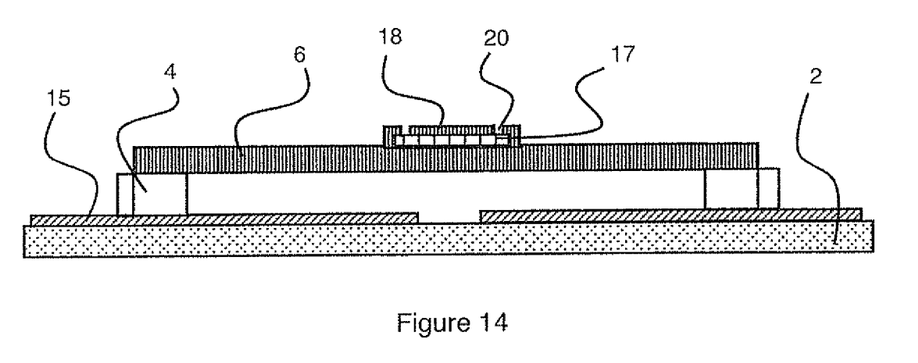
FIGS. 14 to 17 schematically represent the different steps of the method for manufacturing the bolometric detector according to FIG. 13, in cross-section.

More particularly, the method comprises formation of a membrane 1 suspended above a substrate 2 provided with antennas 15. As represented in FIG. 14, a resistive element 17 is deposited on a dielectric layer 6 and covered by a dielectric thin layer 18. Two openings 20 are made in dielectric thin layer 18 so as to expose two areas of resistive element 17.

Figure 15:
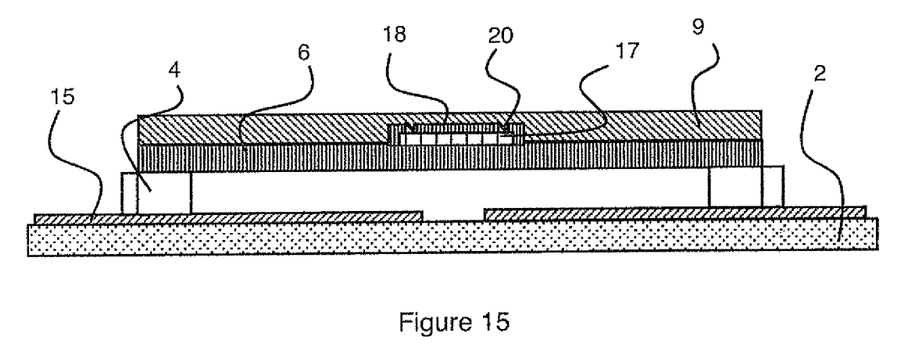

As represented in FIG. 15, a thin layer of semiconducting iron oxide 9 is deposited by means of any known method on dielectric layer 6 and on resistive element 17 covered by dielectric thin layer 18. Openings 20 are filled by thin layer of semiconducting iron oxide 9.

Figure 16:
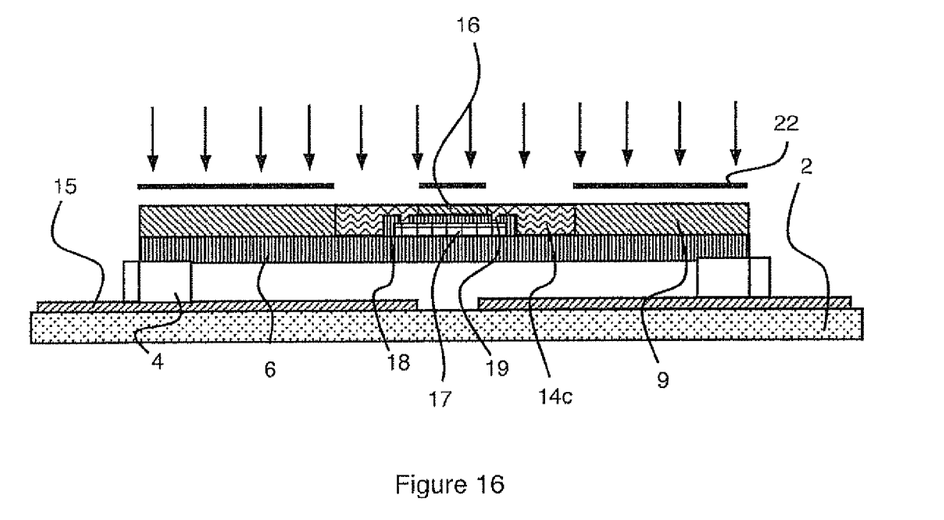

The two electrically conducting metallic iron areas 14c are then formed by localized reduction through a mask 22, by means of the annealing technique or bombardment obtained by means of the reactive ion etching technique described in the foregoing (FIG. 16). Each metallic iron area 14c is connected to resistive element 17 by a contact at its apex 19. The position of metallic iron areas 14c is defined so as to achieve capacitive coupling with antennas 15.

As represented in FIG. 17, a thin layer of totally oxidized iron oxide 16 is then formed though a mask 23 by localized oxidation of thin layer of semiconducting iron oxide 9 to form an electrically insulating and heat-conducting area surrounding the two metallic iron areas 14c and resistive element 17. Localized oxidation insulates the two metallic iron areas 14c from one another and prevents short-circuiting. Oxidized areas 16 then preferably have a conductivity of less than $10^{-9}$ $S \cdot m^{-1}$.

The localized oxidation step of thin layer of semiconducting iron oxide 9 into a layer of totally oxidized iron oxide 16 can be performed by annealing at a temperature of less than 300° C., or advantageously by bombardment obtained by means of the reactive ion etching (RIE) technique, in the presence of at least one oxidizing species such as oxygen $O_2$, carbon dioxide $CO_2$ or water $H_2O$. Layer of totally oxidized iron oxide 16 preferably has a ferric oxide $Fe_2O_3$ base.

For example purposes, in the case of annealing, oxidation of magnetite in the presence of oxygen obeys the following equilibrium:

$$2\ Fe_3O_4 + \tfrac{1}{2}O_2 \longleftrightarrow 3\ Fe_2O_3$$

In the case of reactive ion etching, the oxidizing plasma is for example $O_2$, $CO_2$ or $H_2O$. The plasma is activated to form free radicals O• or OH•. The latter react with magnetite to form insulating ferric oxide $Fe_2O_3$.

According to an alternative embodiment that is not represented, the manufacturing method can comprise a reduction step of thin layer of semiconducting iron oxide 9 to form a metallic iron area 14c followed by a step of oxidation of a part of metallic iron area 14c thus obtained. Oxidation of $Fe^0$ into $Fe^{3+}$ is then preferably performed by bombardment obtained by means of the reactive ion etching technique in the presence of an oxidizing species.

According to an alternative embodiment that is not represented, the manufacturing method can comprise a step of localized oxidation of thin layer of semiconducting iron oxide 9 to modify the degree of oxidation of the iron atom of a part of thin layer of semiconducting iron oxide 9.

The oxidizing species can be introduced in their stable form in the oxidation step or be synthesized in situ. For example purposes, for a reduction by reactive ion etching in the presence of hydrogen, depending on the etching conditions, water originating from the reaction between the protons and the oxygen of the oxide can form. The water thus formed in situ can then constitute the oxidizing species of the subsequent oxidation step.

The use of an iron-based thermistor, in particular having a base formed by semiconducting iron oxide 9, enables the reduction and oxidation steps to be alternated when the manufacturing method of the bolometric detector is performed, thereby forming iron-base areas having different electrical and heat conduction properties. This method thereby offers a large number of possibilities of functionalization and optimization of the bolometric detector.

The methods described in the foregoing can enable the performances of the bolometric detector to be improved by optimizing the contact between electrode 7 and semiconducting thin layer 9 forming the thermistor, as well as enabling the detectors to be functionalized for various applications in particular for terahertz detection or infrared imaging systems. The techniques used, in particular reactive ion etching, which are commonplace in the micro-electronics industry, make for easy and inexpensive industrial integration.

The invention claimed is:

1. A method for manufacturing a bolometric detector equipped with a membrane suspended above a substrate by means of heat-insulating arms fixed to the substrate via anchoring points, said membrane having a thin layer of heat-sensitive semiconducting iron oxide, a method comprising at least a step of localized reduction and/or oxidation of the thin layer of semiconducting iron oxide to modify the degree of oxidation of the iron atom of a part of the thin layer of semiconducting iron oxide.

2. The method according to claim 1, wherein the step of localized reduction of the thin layer of semiconducting iron oxide forms at least one metallic iron area.

3. The method according to claim 2, wherein reduction is an anneal, in a reducing atmosphere, performed at a temperature of less than 300° C.

4. The method according to claim 2, wherein reduction is a bombardment obtained by means of a reactive ion etching technique in the presence of at least one reducing species or a noble gas.

5. The method according to claim 1, wherein the iron oxide is at least partly spinel-structured.

6. The method according to claim 1, wherein the step of localized oxidation of the thin layer of semiconducting iron oxide forms a thin layer of totally oxidized iron oxide.

7. The method according to claim 6, wherein the thin layer of totally oxidized iron oxide has a ferric oxide $Fe_2O_3$ base.

8. The method according to claim 1, wherein the step of localized oxidation is a bombardment obtained by means of a reactive ion etching technique in the presence of at least one oxidizing species.

9. The method according to claim 1, wherein, the membrane comprising at least one titanium nitride-based electrode, the method comprises formation of a metallic iron area in contact with the electrode, by localized reduction of the thin layer of semiconducting iron oxide, said metallic iron area being pass-through in the direction of the thickness of the thin layer of semiconducting iron oxide.

10. The method according to claim 9, wherein the titanium nitride-based electrode comprises a metallic titanium area formed during said localized reduction and in contact with the metallic iron area of the thin layer of semiconducting iron oxide.

11. The method according to claim 1, comprising formation, by localized reduction of the thin layer of semiconducting iron oxide, of several metallic iron areas forming repetitive identical patterns and arranged in periodic manner with a predefined pitch, said metallic iron areas forming a reflecting filter enabling electromagnetic radiations corresponding to said pitch to be detected.

12. The method according to claim 1, wherein the substrate being provided with two antennas and the thin layer of semiconducting iron oxide being provided with a resistive element, the method successively comprises:
   formation of two electrically conducting metallic iron areas, by localized reduction of the thin layer of semiconducting iron oxide, the areas being electrically connected to the resistive element and forming a capacitive coupling with said antennas, and
   formation, by localized oxidation of the thin layer of semiconducting iron oxide, of a thin layer of totally oxidized iron oxide forming an electrically insulating and heat-conducting area surrounding the two metallic iron areas and the resistive element.

13. The method according to claim 1, successively comprising:
   deposition of a thin layer of semiconducting iron oxide on said membrane,
   localized reduction of the thin layer of semiconducting iron oxide through a mask to form at least one metallic iron area and,
   selective chemical etching of the metallic iron areas.

* * * * *